A. P. STRONG.
VALVE FOR CONVEYING SYSTEMS.
APPLICATION FILED NOV. 12, 1915.
1,185,261.
Patented May 30, 1916.
2 SHEETS—SHEET 1.
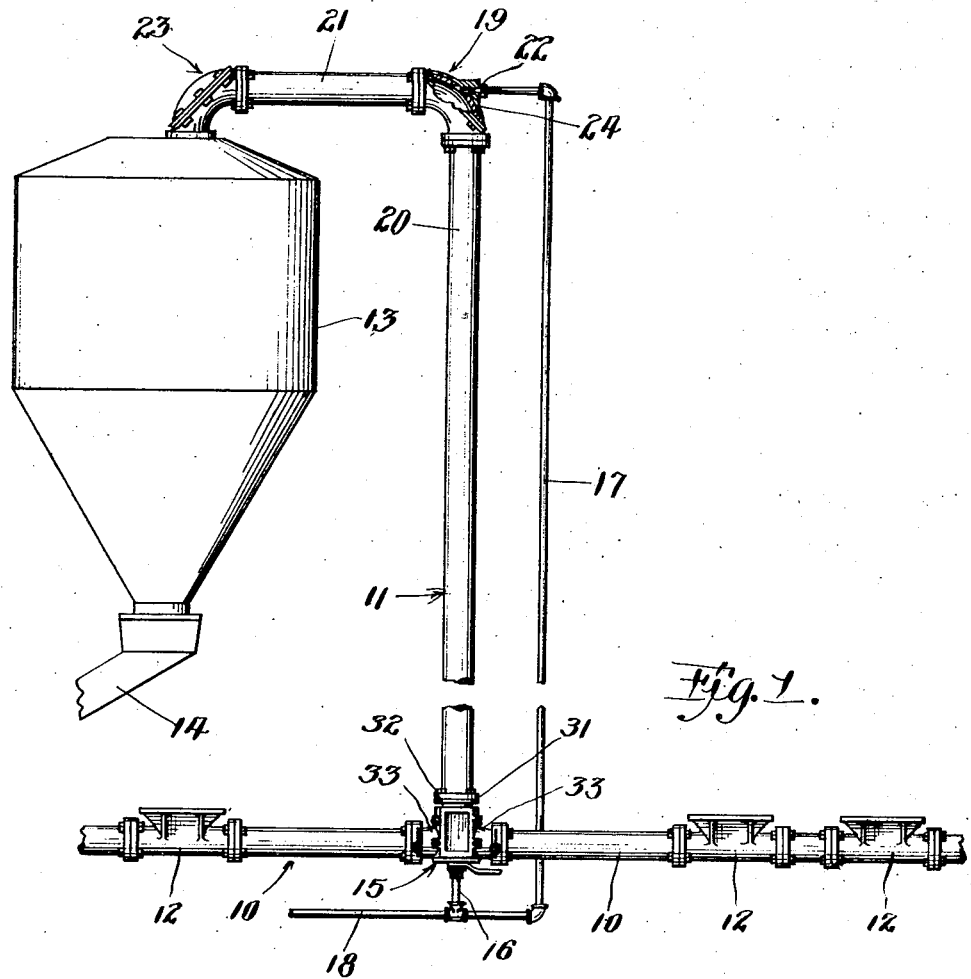
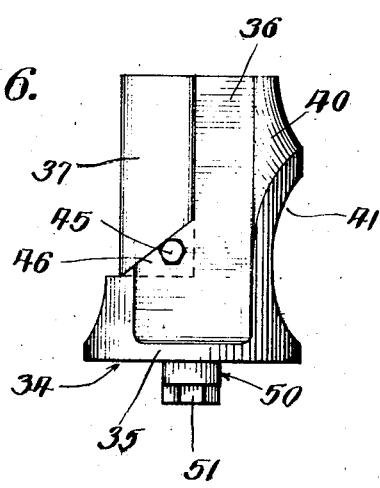

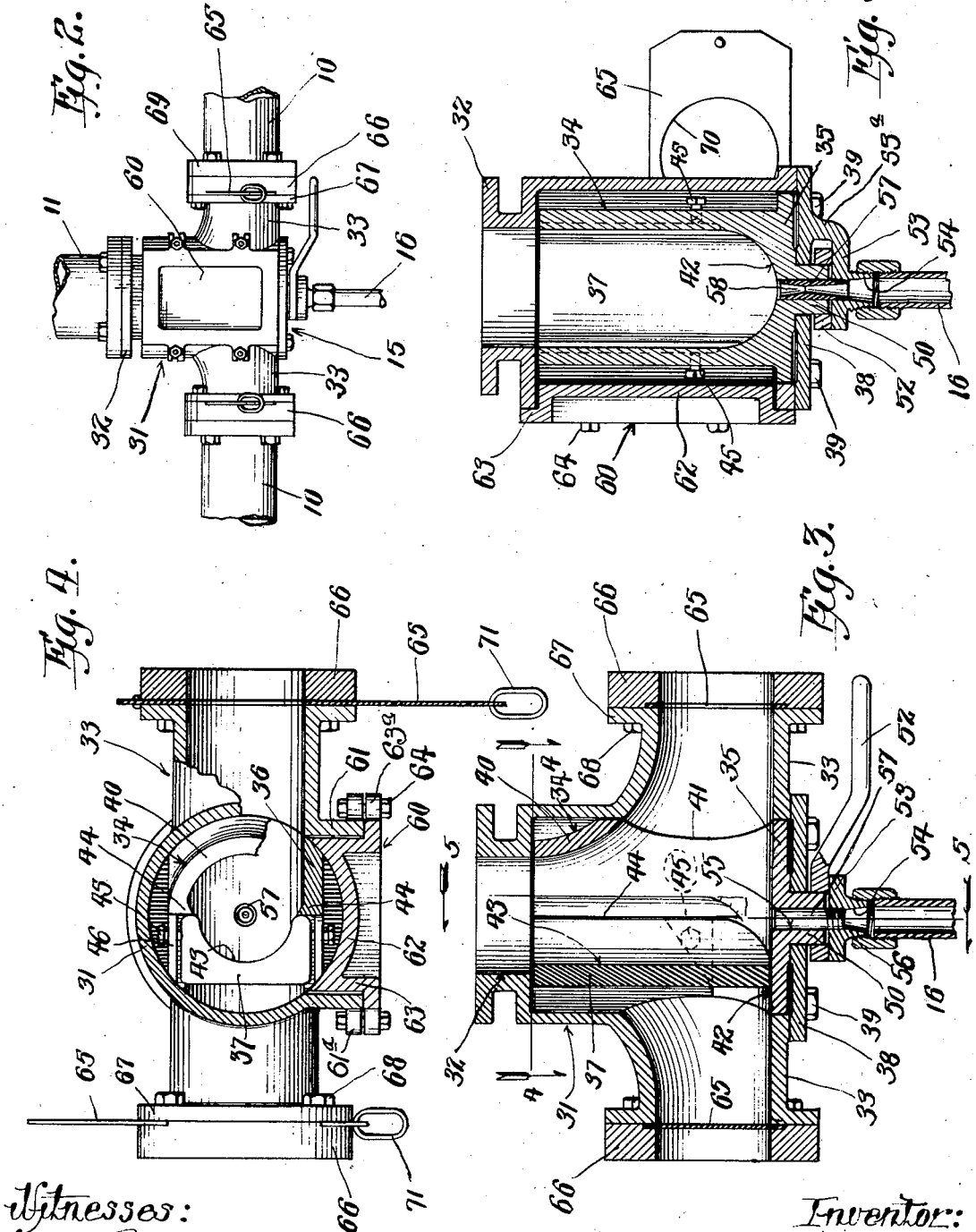

UNITED STATES PATENT OFFICE.

ARTHUR P. STRONG, OF CHICAGO, ILLINOIS, ASSIGNOR TO GREEN ENGINEERING COMPANY, OF EAST CHICAGO, INDIANA, A CORPORATION OF ILLINOIS.

VALVE FOR CONVEYING SYSTEMS.

1,185,261. Specification of Letters Patent. Patented May 30, 1916.

Application filed November 12, 1915. Serial No. 61,034.

*To all whom it may concern:*

Be it known that I, ARTHUR P. STRONG, a citizen of the United States, and a resident of Chicago, in the county of Cook and State of Illinois, have invented certain new and useful Improvements in Valves for Conveying Systems; and I do hereby declare that the following is a full, clear, and exact description thereof, reference being had to the accompanying drawings, and to the letters of reference marked thereon, which form a part of this specification.

This invention relates to improvements in pneumatic conveying systems for ashes and like material, wherein the same are carried by suction to a point or place of disposal through pipes or conduits, and more particularly to fittings adapted for use in the construction of the pipes or conduits of such systems. Conveying systems of the character described are to be found and practically applied in the handling or disposal of ashes from furnaces and boilers, and particularly desirable in large plants or installations of a considerable number of units. A well known system for handling ashes pneumatically through conduits or pipes consists, in general, of one or more conduits, which extend in close proximity to the boilers and usually below the floor level in front of the furnaces of such boilers, each conduit or pipe being provided at intervals with intake members or openings (there being preferably provided one for each furnace), adapted to receive the ashes discharged from each furnace. The branch pipe or pipes if there are more than one, depending on the arrangement of the system, communicate with a main pipe which leads directly to a receiver or tank into which the ashes are carried and from there are removed and ultimately disposed of.

Although any well known method may be employed for creating suction in the conduits of the system, the particular method herein described and illustrated embodies the utilization of steam and the introduction of the same in the form of jets at several points in the conduits and through suitable nozzles preferably incorporated in the fittings at the bends or turns in the conduits and arranged to direct the jets of steam in the direction of movement of the ashes or like material. In the construction of ash handling or conveying systems of this nature, an important factor to be considered and provided for is the abrasive action of the ashes or like material upon the inner surface of the conduits or pipes as it is carried therethrough, due to the hardness of the material and the rapidity with which it is moved along the pipes and in contact with the surfaces thereof. The effect of this action is manifestly greater at points in the pipe where a bend occurs, and to overcome the increased wearing effects, fittings provided with a wear resisting member or wearing back of hard metal are ordinarily used, the same being preferably adapted to be removed for the purpose of replacing the same with a new wearing back from time to time.

Among the objects of my invention is to provide a valve fitting adapted to be placed at a bend or right angle turn in the pipe, and embracing a wear resisting member or wearing back, said fitting being preferably of the T form, that is, having lateral openings or connections adapted to communicate with branch pipes extending in different directions, and a single opening or connection adapted to communicate with a pipe arranged at an angle to the branch pipes. This fitting comprises, generally, a casing having mounted therein a valve member embracing said wearing back and designed to be revolved into one position to shut off communication of one of the branch pipes with the single or main pipe and to permit the material to pass from the other branch pipe into said main pipe leading to the receiver, and to be revolved into another position to reverse the conditions, namely, to effect communication of the first mentioned branch pipe with the main pipe and shut off communication of the other branch pipe with said main pipe. In this particular fitting, hereinafter to be described and illustrated in the drawings, the parts are arranged in such a manner that the alined openings of branch connections are adapted to communicate with two branch pipes in alinement with each other and constitute the inlet openings or passages of the fitting or casing, and the single opening at right angles to the axes of the alined openings constitutes the outlet opening or passage of the casing and communicates with the main pipe and is adapted to receive the material conveyed from one or the other of the branch pipes through the valve member of the casing.

A further feature of my invention resides in the application of a nozzle for introducing a steam jet into the interior of said valve fitting, the same constituting a permanent part of the structure of said fitting and forming a part of the suction creating means of a conveying system of the type hereinbefore described.

The features of my invention will be readily understood from the detailed description which follows and by reference to the accompanying drawings, in which—

Figure 1 is a view in elevation showing the general arrangement of a pneumatic ash conveying system to which my invention relates; Fig. 2 is a view in elevation of the valve fitting and pipes connected therewith; Fig. 3 is a view in longitudinal section taken through the casing and valve member; Fig. 4 is a cross-sectional view taken on line 4—4 of Fig. 3; Fig. 5 is a view in vertical transverse section taken on line 5—5 of Fig. 3; and Fig. 6 is a view in elevation of the valve member and wearing back removed from the casing.

Referring now in detail to the features embodied in my invention: Fig. 1 illustrates an arrangement of an ash conveying system embodying the invention and suitable for a boiler plant of two or more units, preferably arranged in groups, as regards the method of handling the ashes of said units, it being understood for the purposes of this invention that each group is served by a horizontal branch pipe 10, 10, which communicates with a single vertical main pipe 11. The branch pipes 10, 10 are provided at intervals with intake members or fittings 12, each of said fittings being situated immediately in front of and adjacent to the ash removing door or opening of a furnace. These intake fittings are preferably provided with upwardly opening receptacles having covers or closures which are removed while the ashes are being introduced into the intake members. The ashes are thence carried by suction through the branch pipes and main pipe to a suitable receiver or tank 13, herein illustrated as a vertically disposed, cylindric container provided at its lower end with a conical shaped portion, at the apex of which is a suitably controlled discharge opening or chute 14 whereby the receiver is emptied at suitable intervals and the ashes removed in dump cars or wagons or otherwise disposed of.

The branch pipes 10, 10 are connected with the main vertical pipe 11 by means of a fitting 15 resembling the usual form of T fitting, but which in reality is the hereinbefore mentioned valve casing provided with a valve member adapted to be revolved to shut off communication of either branch pipe with the main pipe. By means of the valve the branch pipes may be operated alternately, that is, the ashes from the furnaces served by one branch pipe may be removed during an interval in which the other branch pipe is not operative, and vice versa.

Fig. 1 also illustrates a suitable arrangement of the suction producing means of the system and which may be briefly described as comprising two steam pipes 16, 17, each communicating with a main steam supply pipe 18 and terminating in a nozzle incorporated in the valve member 15, at a junction of the branch pipes 10, 10 and the main pipe 11 and an elbow fitting 19, respectively, located at the junction of the vertical portion 20 of the main pipe 11 and a horizontal portion 21 thereof, adjacent to the receiver 13. The nozzles are preferably arranged so that the steam jets are introduced into the pipe in the direction of movement of the material and, furthermore, in direct alinement with the pipe into which the material passes after passing through the fitting at the turn or bend. Thus the nozzle in the valve member 15 is directed into the entrance of the vertical pipe 20 of the main pipe 11, and the nozzle 22 of the elbow fitting 19, introducing a jet of steam, directed into the entrance of the horizontal portion 21 of the main pipe 11. The elbow fitting 19 and likewise the similar fitting 23 immediately adjacent the receiver are preferably of that type having a wearing back or lining 24 mounted within the same and extending throughout the surface of maximum radius, there being provided an aperture in said wearing back 24 of the elbow fitting 19 through which the steam jet may issue.

Referring now in detail to the valve fitting 15 embodying the features of my invention, the same comprises a casing of cast metal, having the general form of the usual T fitting, namely, a cylindric body portion 31 having an opening and flanged pipe connection 32 at one end and two cylindric branch connections 33 communicating with the body portion 31 and extending laterally in opposite directions and at right angles to the body portion 31. The branch connections are preferably in alinement with each other and communicate with the body portion at the end thereof distant from the opening or pipe connection of said body portion. In the device so constructed, the two branch portions or connections 33, 33 serve as inlet passages to the body portion 31 and are adapted to be connected to the horizontal branch pipes 10, 10 (Figs. 1 and 2), and the pipe connection 32 of the cylindric body portion is adapted to communicate with the vertical main pipe 11 and constitutes the single outlet opening of the casing. Mounted within the cylindric body portion 31 of the casing is the rotative valve member 34 (Figs. 3 to 6), the same being arranged concentric with the body portion 31 and adapted to be revolved about an axis coincident with the axis of said body portion and the outlet opening or connection 32 thereof.

The valve member has the general form of a hollow cylindric shell, having a vertical central passage which is open at one end and communicates with the outlet opening 32 of the body portion 31. The valve member further consists of three main parts or elements, namely, a circular base plate 35, wall portions 36 and 40 integral with the base plate 35, and a removable wearing back 37 secured between parallel portions 36, 36 of the valve walls and supported upon the base plate 35 and forming a part of said valve member. The base plate 35 and the wall portions are integral with each other, the former being located within a circular depression or seat formed within the bottom wall of the casing, said seat being preferably formed by removing a circular portion of said bottom wall and applying a cover or bottom plate 38 which extends over said opening and upon which rests the base plate
35. This cover is secured in position by means of a plurality of screws 39 to permit removal of the entire valve member if desired. Extending from the base plate 35 are the parallel wall portions 36, 36, the same being oppositely disposed and terminating a short distance from the upper wall of the body portion 31 and adjacent to the outlet opening 32, said wall portions being further spaced apart a distance substantially equal to the interior diameter of the branch connections 33, 33. Thus when the valve is in the position shown in Fig. 3 of the drawings, said walls are in alinement with the side wall portions of the branch connections 33 and form in effect a continuation thereof. As shown in Fig. 6, these parallel wall portions throughout the upper part of the valve member are considerably less in width than through the lower portion thereof, this reduction in width being accomplished by cutting away what may be termed the rear half of the wall along a central line extending from the upper ends of the walls to a point midway of the height of the wall and from thence along a line sloping rearwardly until it intersects a curved wall portion adjacent to the base of the valve member. So cutting away the parallel wall portions, as shown, leaves an open space throughout one side or rear portion of the valve member, it being understood at this time that the wearing back 37 is inserted between the parallel wall portions 36, 36, thereby completely closing the opening formed by cutting away the wall portions as described and thus forming the rear wall of the valve member, said wearing back having an inwardly facing concave surface which forms in effect a continuation of the inner surfaces of the parallel walls and preserves the cylindric contour of the central passage of the valve member. The valve member is further provided with a circular aperture 41, formed in a curvilinear wall portion 40, extending between the parallel wall portions 36, 36 and opposite the concave surface of the wearing back 37. The aperture 41 is located at the lower end of the valve member adjacent to the base plate 35. The portions of the wall 40 immediately surrounding the aperture 41 are cylindric in contour and conform to the curvature of the base plate 35 and the inner surface of the body portion of the casing. The aperture 41 is equal in diameter to the openings of the branch connections 33 with the body portion and is adapted to register with either of said openings, the wall portions immediately surrounding said aperture of the valve member being brought into close proximity to the corresponding surfaces of the openings from said branch connections, thus providing as far as possible a continuous and non-leaking connection between the branch connections 33 and the central passage of the valve member. It is to be noted that the upper wall portions of the branch connections 33, 33 are curved upwardly and substantially on the arc of a circle, which if continued beyond their lines of intersection with the body portion 31 would coincide with or be tangent to the inner surface of the discharge opening 32 at the upper end of the body portion. To preserve this curvature and to thus provide a smooth and regular passage as is common in the usual elbow fitting, the wall 40 of the valve member immediately above the aperture 41 is curved on the arc of a circle having the same radius as the upper wall portion of the branch connections 33, 33. Thus when the valve is in a position such that the aperture 41 registers with the right hand branch connection 33, as shown in Fig. 3, the curved portion of the wall 40 forms a continuation of the upper wall portion of said branch connection, thereby providing a smooth and continuous surface of regular curvature through this portion of the valve passage between the opening of the branch connection 33 and the discharge opening 23 of the body portion.

Referring now to the construction of the lower portion of the valve and to that of the wearing back, it is to be observed that the bottom walls of the branch connections 33, 33 are straight and lie in the same horizontal line, hence it follows that the bottom surfaces of the passages in said branch connections are semicircular in sectional contour. Bearing this in mind, it may be said that the lower portion of the valve member is formed to provide an upwardly facing, concave surface extending transversely of the valve member between the side wall portions 36, 36 and from the aperture 41 to the opposite side of the valve member. This surface constitutes the bottom surface 42 of the passage of the valve member and is formed by curving the lower portion of the vertical wall portions 36, 36 inwardly, thus forming a horizontal trough or passage semicircular in contour extending between and constituting in effect a continuation of the bottom surface of the branch connections 33, 33. This construction is clearly shown in Fig. 5, although it is to be understood that a portion of this curved bottom surface serves as a seat for the wearing back 37, which completely closes this passage and shuts off communication between the branch pipes or connections 33, 33.

The wearing back 37 consists of a block of exceedingly hard metal, such as white iron, generally rectangular in shape but provided on one face with a concave groove 43, hereinbefore mentioned. The wearing back is adapted to be placed in vertical position between the side walls of the valve member, the concave surface thereof facing toward the aperture 41 of the valve member and constituting the rear wall of the passage in the valve member, as has heretofore been pointed out. The lower end surface of the wearing back is curved to correspond with the semicircular curvature of the bottom surface, said wearing back resting upon said bottom surface and forming a close contact between the coacting surfaces of said members. The wearing back extends upwardly from the said bottom surface and occupies the space formed by the cutting away of the portion of the wall of the valve member as hereinbefore described. The width of the wearing back is slightly greater than that of the space between the parallel wall portions 36, 36, the vertical margins of said wearing back at either side of the concave surface 43 having abutting relation with the end vertical faces of said wall portions, there being preferably provided inwardly projecting ribs 44, 44 extending along the inner edges of said wall portions from the upper margins thereof substantially to the point where the curvature of the bottom wall originates, as shown in Fig. 3. These ribs provide shoulders which face rearwardly and have abutting contact with the forward margins of the wearing back substantially throughout its length, the inclined lateral faces of said ribs forming intermediate connecting surfaces between the concave surface 43 of the wearing back and with each of the parallel faces of the walls 36, 36. The wearing back is held in position by means of set screws 45, 45, which extend through triangular shaped portions 46, 46 of the walls 36, 36 (Fig. 6), said portions being of reduced thickness and located on opposite sides of the wearing back. The set screws engage the opposite sides of the wearing back and are adapted to securely retain the same in position. By loosening said screws, it is apparent that the wearing back may be disconnected from the valve member and removed from the casing in a manner hereinafter to be set forth. It is now clear that the wearing back, although removable, normally forms a part of the valve member and constitutes the rear wall thereof, it being the portion of the valve member which receives the impact of the ashes and material entering the valve from the branch pipes and is subjected to the abrasive action of the same in passing through the valve member, the wear or abrasive action being exceedingly great at this point, since the ashes are abruptly turned in their course to a direction at right angles to that in which they were previously being carried.

As has been already suggested, the valve member is adapted to be revolved in order that communication can be established between one or the other of the branch pipes 10, 10 and the main pipe 11 as desired, the rotation being preferably effected by the provision of an operating lever located exterior to the casing. The arrangement of this lever and the manner of connecting the same to the valve member will be understood from the following: Integral with the base plate 35 of the valve member and in concentric relation therewith is a tubular projection or flange 50 extending through and a short distance beyond the bottom plate 38, the end portion 51 beyond the bottom plate being hexagonal in shape, as shown in Fig. 6. Mounted upon the hexagonal portion 51 of the tubular projection 50 is a lever 52, the same being provided with a hexagonal portion adapted to engage the similarly shaped portion of the tubular projection 50 in the usual manner, and the handle of said lever extending at right angles to the axis of the valve member. The lever is held in place by means of a bracket 53 made integral with the bottom plate 38 by means of the downwardly depending arm 53ª (Fig. 5), said bracket being disposed a short distance below the bottom plate and immediately adjacent to the end of the tubular projection 50. The handle of the lever 52 is interposed between the bottom wall 38 and said bracket and rests upon the latter, said handle being thus held in engagement with the hexagonal extremity of the projection or flange 50. It is obvious that the valve member may be revolved by rotating the handle of the lever 52, since the projection to which it is attached is an integral part of the valve member, thus by operating the lever the valve member may be rotated about a vertical axis through an angle of 180 degrees from the position in which it is shown in Figs. 3 and 4, thereby shutting off the right hand branch connection 33 and establishing communication between the left hand branch connection 10 and the main pipe 11, in the manner before described. If desired, lugs or suitable stop members may be provided upon the lower surface of the bottom plate 38 and in proper position to be engaged by the handle of the lever 52, thereby indicating the proper relation to the branch connections 33, 33 of the valve member. The bracket 53 is provided with a central aperture 54, which is in vertical alinement with an aperture or bore 55 extending centrally of the projection 50 through the base plate 35 and communicating with the interior of the valve member, the axis of said bore being preferably coincident with the axis of the body portion 31 of the casing. The central aperture 54 of the bracket 53 further extends through an integral nipple 56 depending from the lower surface of the bracket, said nipple having attached thereto, by suitably threaded pipe connections, the steam pipe 16 hereinbefore referred to. Within the upper portion of the aperture 54 of the bracket is mounted a nozzle 57, the same having screw-threaded engagement in said aperture 54 and projecting upwardly through the bore 55 in the projection 50 and base plate 35 of the valve member and terminating immediately below the surface of the bottom wall 42 of the valve member. As shown in Fig. 5, the nozzle consists of a tubular member having a central passage restricted intermediate its ends to provide an orifice 58, the passage tapering from said orifice toward the opposite ends of said passage. By means of the nozzle and connection described, a jet of steam may be introduced into the vertical passage of the valve member and into the entrance of the pipe 11, thereby creating a suction at that point, which serves to carry the ashes or material into and through the valve passage and onward through the pipe 11.

In order to afford access to the interior of the casing for the purpose of removing the wearing back 37, when the same has become worn and replacement thereof is required, it is preferable to provide the body portion 31 with a removable wall section in the form of a cover plate 60, the same extending throughout the length of the body portion and substantially equal in width to the diameter thereof. The opening which is normally closed by the cover plate is located in one side of the body portion 31 intermediate the branch connections 33, as shown in Figs. 2 and 4, said opening being surrounded by an outwardly extending flange 61. The cover plate is provided with a curvilinear central portion 62 having the same contour as the inner surface of the body portion and provided at its margin with flanges 63 corresponding to the flanges 61 surrounding said opening and adapted to engage the same. The cover 60 is removably retained within the opening by the provision of bifurcated lugs 63$^a$ integral with the flanged margins of said cover and located along the side margins thereof, said lugs being adapted to engage bolts 64 retained in corresponding lugs 61$^a$ formed integral with the flanges 61 surrounding the opening. The bolts are normally tightened to hold the cover in closed position, but on loosening the same the cover may be removed and access had to the interior of the casing for the purpose of loosening the set screws 45, 45 and thereby remove the wearing back. The provision of this opening in the wall of the casing affords an easy access to the wearing back and, furthermore, permits the removal thereof without disconnecting or otherwise disturbing the steam connections with the nozzle, which would be necessary if it were required to remove the bottom plate 38 and draw the entire valve outwardly therethrough in order to obtain access to said wearing back.

In order to insure the complete closing or sealing of the branch connections 33, 33, when one or the other is in open communication with the main pipe through the valve member, it is preferred to provide gate members or auxiliary valves in each of said branch connections 33, 33. Each gate member comprises a rectangular plate 65 adapted to be moved endwise in slots formed in the faces of rings 66, 66, rigidly secured to the end flanges 67 of the branch connections by means of suitable bolts or screws 68, said rings being interposed between said flanges 67, 67 and the flanges 69, 69 of the branch pipes 10, 10, as shown, with the slots opening against the surfaces of said flanges 67, 67. The rings are provided with central apertures registering with the bore or passage of the branch connections and form in effect continuations of the end flanges 67. Each plate 65 is provided adjacent to one end with an aperture 70 equal in diameter to that of the bore of the passage, the opposite end portion of the plate being solid or imperforate. The plates are adapted to be moved endwise into positions in which the aperture 70 may be brought into registering relation with the passage, thereby maintaining the same in open position, or interposing the solid portion of the plate in the passage, thereby entirely closing the passage and preventing the leakage of air into the valve from the non-operative branch pipe. The ends of the plate are provided with rings 71, 71 or other suitable members acting as means for manipulating the plates and as stops for limiting the endwise movement of the plates and insuring the proper registration of the aperture and imperforate portion thereof.

The use of a valve fitting is of a material advantage in systems of this nature, in that it permits the arrangement herein described, namely, the use of branch pipes or conduits communicating with a single main pipe leading to the receiver, each of said branch pipes or conduits serving a group of furnaces and adapted to be operated during alternate periods in the removal of ashes from each of said groups. This arrangement is particularly desirable and is made practical by the provision of a valve fitting adapted to be placed at the junction of the branch pipes and main pipes, said valve fitting being capable of shutting off one or the other of the branch pipes and at the same time having a movable or rotative valve member that is capable of withstanding the abrasive action of the ashes and material carried through the valve. The presence of the wearing back as a part of the valve member therefore renders it possible to employ a valve fitting in the manner described, it being manifest that in the absence of an abrasive resisting element the valve would not be capable of withstanding the abrasive action of the material in passing therethrough, and hence its use wholly impractical. Furthermore, the particular arrangement of the wearing back, whereby the same may be removed from the valve member, and the provision for easily removing the wearing back from the casing are features contributing to a desirable construction from the point of time and labor spent in the replacement of the wearing back.

A further advantage results in the incorporation of a permanent steam nozzle in the valve fitting, in that the proper location for introducing the steam jet is thereby secured, namely, at the points or places in the pipes or conduits where a turn or bend occurs, it being possible in this manner to protect the nozzle from direct contact with the material in passing through the fitting. Furthermore, the nozzle is so situated that it is unaffected by the manipulation of the valve member, thus providing a continuous and uninterrupted flow of steam irrespective of the position of the valve or the particular branch pipe that is operative.

The details of construction of the system and parts thereof embodying the features of the invention may be varied from those herein shown and described, and therefore it is not desired that the invention be limited, except in so far as specifically pointed out in the appended claims.

I claim as my invention:

1. A conveying system for abrasive materials, comprising a casing having an outlet opening communicating with a main pipe and inlet openings communicating with branch pipes, a valve member rotatively mounted in said casing and provided with a central passage having constant communication with said outlet opening and adapted to communicate with one or the other of said inlet openings, there being provided an aperture arranged opposite the outlet opening and connecting said central passage with the exterior of said casing.

2. In a conveying system for abrasive materials, the combination of a casing, comprising a cylindric body portion having an outlet connection and branch inlet connections arranged at right angles to said outlet connection, a valve member mounted in said body portion and provided with a central passage communicating with said outlet connection and having an aperture adapted to register with one or the other of said branch connections, and an axially arranged tubular projection integral with said valve member and projecting through said casing and provided with an aperture therethrough opposite said outlet connection.

3. In a conveying system for ashes or like materials, the combination of a casing having a cylindric body portion provided with an outlet opening at one end thereof and branch inlet openings at right angles to said outlet opening, a valve member rotatively mounted in said casing and comprising a base plate, a cylindric wall integral with said base plate and forming a central passage communicating with said outlet opening, said wall being provided with an aperture adapted to register with said branch openings, a wearing back of hard metal removably mounted on said valve member and forming a portion of the wall of the valve member opposite said aperture, and an aperture extending through said base plate opposite said outlet opening.

4. In a conveying system for ashes and like materials, the combination of a casing, comprising a cylindric body portion having a pipe connection at one end and branch pipe connections adjacent to its opposite end and arranged at right angles thereto, a valve member mounted in said body portion and provided with a central passage communicating with said outlet connection and having an aperture adapted to register with one or the other of said branch connections; means for rotating said valve member, comprising a projection integral with said valve member and projecting through said casing, said projection being provided with a bore in axial alinement with said outlet opening, and means secured to said projection for rotating said valve member.

5. In a system for conveying ashes or like materials, the combination of a casing having an outlet opening and a laterally extending inlet opening, a valve member rotatively mounted in said casing adapted to open and close one of said openings, a wearing back removably mounted on said valve member, said casing being provided with an opening in the body portion to permit access to said wearing back, and a cover plate removably attached to said casing and extending over said opening.

6. In a system for conveying ashes or like materials, the combination of a cylindric casing provided with laterally extending branch connections communicating therewith, a valve member rotatively mounted in said casing, a removable plate at the opposite end of said body portion, a wearing back removably mounted on said valve member, said casing being provided with an opening extending longitudinally thereof, adjacent to said valve member, to permit access to said wearing back, and a cover removably attached to said casing and extending over said opening.

In testimony, that I, claim the foregoing as my invention I affix my signature this 8th day of November A. D. 1915.

ARTHUR P. STRONG.